United States Patent
Jia

(10) Patent No.: US 11,694,445 B2
(45) Date of Patent: Jul. 4, 2023

(54) OBSTACLE THREE-DIMENSIONAL POSITION ACQUISITION METHOD AND APPARATUS FOR ROADSIDE COMPUTING DEVICE

(71) Applicant: APOLLO INTELLIGENT CONNECTIVITY (BEIJING) TECHNOLOGY CO., LTD., Beijing (CN)

(72) Inventor: Jinrang Jia, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 75 days.

(21) Appl. No.: 17/210,220

(22) Filed: Mar. 23, 2021

(65) Prior Publication Data

US 2022/0083787 A1 Mar. 17, 2022

(30) Foreign Application Priority Data

Sep. 15, 2020 (CN) .......................... 202010965923.6

(51) Int. Cl.
*G06V 20/54* (2022.01)
*G06T 7/73* (2017.01)
(Continued)

(52) U.S. Cl.
CPC ............... *G06V 20/54* (2022.01); *G06T 7/74* (2017.01); *G06V 10/25* (2022.01); *G06V 10/751* (2022.01); *G06T 2207/30236* (2013.01)

(58) Field of Classification Search
CPC ...... G06V 20/54; G06V 10/25; G06V 10/751; G06T 7/74; G06T 2207/30236
See application file for complete search history.

(56) References Cited

U.S. PATENT DOCUMENTS 10,635,844 B1 * 4/2020 Roose .................... G06F 30/20
10,944,900 B1 * 3/2021 Nikitin .................. H04N 7/183
(Continued)

FOREIGN PATENT DOCUMENTS

JP   2005322128 A   11/2005
JP   2006318350 A   11/2006
(Continued)

OTHER PUBLICATIONS

Extended European Search Report, EP Application No. 21164468.7 dated Sep. 24, 2021, 12 pages.
(Continued)

*Primary Examiner* — Ian L Lemieux
(74) *Attorney, Agent, or Firm* — Kwan & Olynick LLP

(57) ABSTRACT

The present application discloses a method and an apparatus of obstacle three-dimensional position acquisition for a roadside computing device, and relates to the fields of intelligent transportation, cooperative vehicle infrastructure, and autonomous driving. The method may include: acquiring pixel coordinates of an obstacle in a to-be-processed image; determining coordinates of a bottom surface center point of the obstacle according to the pixel coordinates; acquiring a homography relationship between a ground surface corresponding to the to-be-processed image and a ground surface corresponding to a template image; transforming the coordinates of the bottom surface center point of the obstacle into coordinates on the template image according to the homography relationship; and determining three-dimensional coordinates of the bottom surface center point of the obstacle according to the coordinates obtained by transformation and a ground equation corresponding to the template image. By use of the solution of the present application, implementation costs can be saved, and the accuracy is better.

14 Claims, 5 Drawing Sheets

(51) Int. Cl.
  *G06V 10/25* (2022.01)
  *G06V 10/75* (2022.01)

(56) References Cited

U.S. PATENT DOCUMENTS

| | | | | |
|---|---|---|---|---|
| 11,170,524 | B1* | 11/2021 | Mishra | G06T 5/50 |
| 2008/0273751 | A1* | 11/2008 | Yuan | G06T 7/579 |
| | | | | 382/103 |
| 2009/0028384 | A1* | 1/2009 | Bovyrin | G06V 20/00 |
| | | | | 382/103 |
| 2010/0322476 | A1* | 12/2010 | Kanhere | G06K 9/6221 |
| | | | | 382/103 |
| 2010/0322516 | A1* | 12/2010 | Xu | G06V 20/53 |
| | | | | 382/173 |
| 2011/0025841 | A1* | 2/2011 | Cunningham | G06T 7/62 |
| | | | | 348/135 |
| 2011/0091131 | A1 | 4/2011 | Price et al. | |
| 2014/0334668 | A1* | 11/2014 | Saund | G06T 7/215 |
| | | | | 382/103 |
| 2014/0362240 | A1 | 12/2014 | Klivington et al. | |
| 2015/0086080 | A1* | 3/2015 | Stein | H04N 7/183 |
| | | | | 382/104 |
| 2017/0126977 | A1 | 5/2017 | Klivington et al. | |
| 2017/0236284 | A1* | 8/2017 | Elliethy | G06T 7/33 |
| | | | | 382/294 |
| 2018/0350085 | A1* | 12/2018 | Lu | G06T 11/60 |
| 2020/0193641 | A1* | 6/2020 | Markkassery | G06T 7/73 |
| 2021/0158567 | A1* | 5/2021 | Dai | G06V 20/588 |
| 2021/0188292 | A1* | 6/2021 | Niem | G06V 20/56 |
| 2021/0350150 | A1* | 11/2021 | An | G06V 30/1902 |

FOREIGN PATENT DOCUMENTS

| | | |
|---|---|---|
| JP | 2006323437 A | 11/2006 |
| JP | 2014515530 A | 6/2014 |
| JP | 2015035070 A | 2/2015 |
| JP | 2017123087 A | 7/2017 |
| JP | 2017156880 A | 9/2017 |
| JP | 2019207456 A | 12/2019 |
| JP | 2020509506 A | 3/2020 |
| KR | 20180048094 A | 5/2018 |
| KR | 1020180048094 A | 5/2018 |
| WO | 2018143263 A1 | 8/2018 |

OTHER PUBLICATIONS

Rida Hamza et al., "Runway Positioning and Moving Object Detection Prior to Landing", Augmented Vision Perception in Infrared: Algorithms and Applied Systems (Series: Advances in Pattern Recognition), 2009, 27 pages.

Juan Diego Ortega et al., "Perspective Multiscale Detection of Vehicles for Real-Time Forward Collision Avoidance Systems" In: "International Conference on Image Analysis and Processing", Naples, Italy, Oct. 28, 2013, 12 pages.

Buyu Li et al., "GS3D: An Efficient 3D Object Detection Framework for Autonomous Driving", 2019 IEEE/CVF Conference on Computer Vision and Pattern Recognition (CVPR), Jun. 15, 2019, 10 pages.

Shanxin Zhang et al., "Vehicle Global 6-DoF pose estimation under traffic surveillance camera", ISPRS Journal of Photogrammetry and Remote Sensing, Amsterdam, Nov. 16, 2019, 15 pages.

Communication pursuant to Art. 94(3) EPC for EP211644638.7, dated Nov. 23, 22, 7 pgs.

First Office Action for JP2021-049635, dated Sep. 20, 22, 4 pgs.

Use Supervoxel to Track Characters in Promiscuous States—JP-English_summary, Jun. 8, 2016, 2 pgs.

Office Action for Japanese Application No. JP2021-049635, dated Jan. 5, 2023, 3 pgs.

* cited by examiner

US 11,694,445 B2

OBSTACLE THREE-DIMENSIONAL POSITION ACQUISITION METHOD AND APPARATUS FOR ROADSIDE COMPUTING DEVICE

The present application claims the priority of Chinese Patent Application No. 202010965923.6, filed on Sep. 15, 2020, with the title of "Obstacle three-dimensional position acquisition method and apparatus for roadside computing device". The disclosure of the above application is incorporated herein by reference in its entirety.

FIELD OF THE DISCLOSURE

The present application relates to computer application technologies, and particularly to a method and an apparatus of obstacle three-dimensional (3D) position acquisition for a roadside computing device in the fields of intelligent transportation, cooperative vehicle infrastructure, and autonomous driving.

BACKGROUND OF THE DISCLOSURE

In a Vehicle-to-Everything (V2X) roadside sensing scenario, in order to acquire over-the-horizon road traffic information through a roadside camera, the roadside camera may generally be installed on a road light pole or traffic light pole. A higher installation position indicates a larger field of view acquired, and there may be more information, which is more conducive to giving full play to a cooperative vehicle infrastructure scheme.

However, due to the higher installation position, camera shaker may occur when the wind blows or heavy vehicles pass by. When the position of the roadside camera changes, a shake error may be introduced during subsequent determination of a 3D position of an obstacle, which may lead to an inaccurate result.

There are methods such as optical image stabilization, mechanical image stabilization, and electronic image stabilization to solve the camera shake. However, due to a cost limitation of roadside sensing, optical image stabilization and mechanical image stabilization with extra costs cannot be used on a large scale, and electronic image stabilization may have a large error.

SUMMARY OF THE DISCLOSURE

The present application provides a method and an apparatus of obstacle 3D position acquisition for a roadside computing device.

A method of obstacle 3D position acquisition for a roadside computing device is provided, including:
acquiring pixel coordinates of an obstacle in a to-be-processed image;
determining coordinates of a bottom surface center point of the obstacle according to the pixel coordinates;
acquiring a homography relationship between a ground surface corresponding to the to-be-processed image and a ground surface corresponding to a template image;
transforming the coordinates of the bottom surface center point of the obstacle into coordinates on the template image according to the homography relationship; and
determining 3D coordinates of the bottom surface center point of the obstacle according to the coordinates obtained by transformation and a ground equation corresponding to the template image.

An electronic device is provided, comprising:
at least one processor; and
a memory communicatively connected with the at least one processor;
wherein the memory stores instructions executable by the at least one processor, and the instructions are executed by the at least one processor to enable the at least one processor to perform a method of obstacle three-dimensional (3D) position acquisition for a roadside computing device, wherein the method comprises:
acquiring pixel coordinates of an obstacle in a to-be-processed image;
determining coordinates of a bottom surface center point of the obstacle according to the pixel coordinates;
acquiring a homography relationship between a ground surface corresponding to the to-be-processed image and a ground surface corresponding to a template image;
transforming the coordinates of the bottom surface center point of the obstacle into coordinates on the template image according to the homography relationship; and
determining 3D coordinates of the bottom surface center point of the obstacle according to the coordinates obtained by transformation and a ground equation corresponding to the template image.

There is provided a non-transitory computer readable storage medium with computer instructions stored thereon, wherein the computer instructions are used for causing a computer to perform a method of obstacle three-dimensional (3D) position acquisition for a roadside computing device, wherein the method comprises:
acquiring pixel coordinates of an obstacle in a to-be-processed image;
determining coordinates of a bottom surface center point of the obstacle according to the pixel coordinates;
acquiring a homography relationship between a ground surface corresponding to the to-be-processed image and a ground surface corresponding to a template image;
transforming the coordinates of the bottom surface center point of the obstacle into coordinates on the template image according to the homography relationship; and
determining 3D coordinates of the bottom surface center point of the obstacle according to the coordinates obtained by transformation and a ground equation corresponding to the template image.

One embodiment of the present application has the following advantages or beneficial effects: 3D coordinates of an obstacle in a to-be-processed image can be determined by means of an acquired homography relationship between a ground surface corresponding to the to-be-processed image and a ground surface corresponding to a template image, which solves the problem of camera shake from the perspective of the image. There is no need to adopt such methods as optical image stabilization, mechanical image stabilization or image stabilization, which not only saves implementation costs, but also has better accuracy.

It shall be understood that the content described in this part is neither intended to identify key or important features of embodiments of the present disclosure and nor intended to limit the scope of the present disclosure. Other features of the present disclosure will be readily understood through the following specification.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Figure 1:
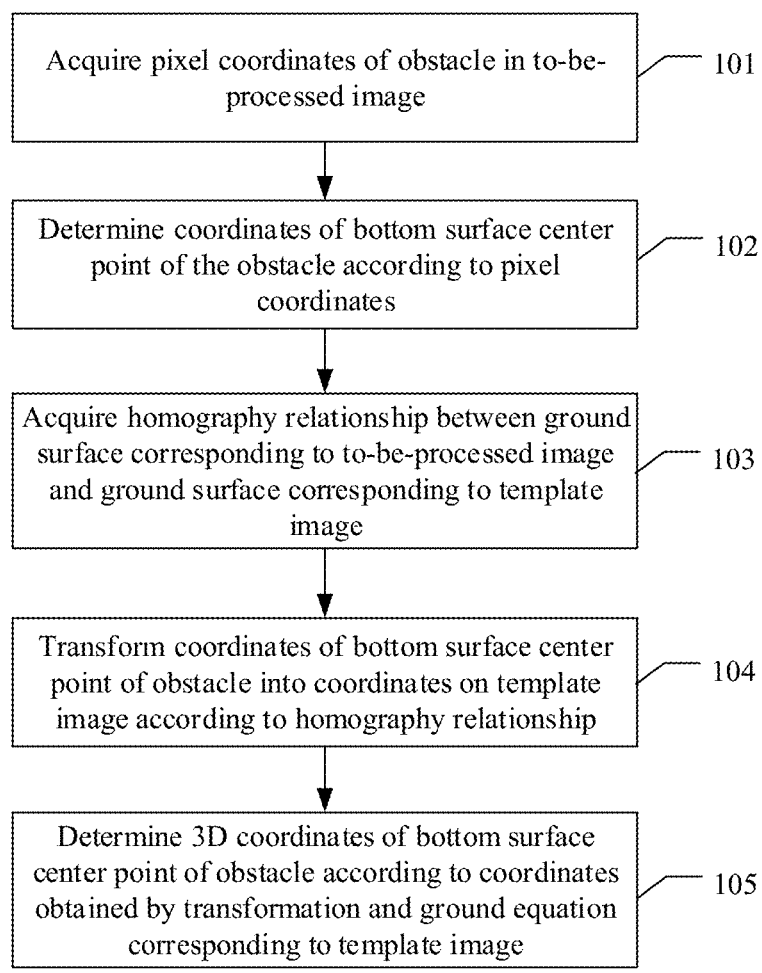
FIG. 1 is a flow chart of a method of obstacle 3D position acquisition for a roadside computing device according to the present application.

Exemplary embodiments of the present application are described below with reference to the accompanying drawings, including various details of the embodiments of the present application to facilitate understanding, and should be considered as exemplary only. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

In the prior art, for a 2D image including an obstacle collected by a roadside camera, a 3D position of the obstacle can be determined in a certain manner, that is, a real position of the obstacle in a 3D space is determined. This process may also be referred to as a back 3D process. The roadside camera is generally a monocular camera.

Since the back 3D process of the monocular camera is an under-constraint problem, any pixel coordinate (pixel point coordinate) in the 2D image back to 3D may be a ray if there is no other input information. That is, points on this ray in the 3D space may have the same pixel coordinates on the 2D image. Therefore, ground plane information is introduced as a reference in consideration of a specific application scenario of V2X. That is, a ground equation $Ax+By+Cz+D=0$ in a camera coordinate system is known, 3D coordinates of a pixel point can be obtained by calculating an intersection point of the ray and the ground equation.

Correspondingly, a specific implementation flow of the back 3D process may include: acquiring pixel coordinates of the obstacle in the 2D image→determining coordinates of a bottom surface center point of the obstacle according to the pixel coordinates→determining 3D coordinates of the bottom surface center point of the obstacle according to the coordinates of the bottom surface center point of the obstacle by using the ground equation.

The camera shake is equivalent to that the shake of the camera coordinate system and the shake of the ground equation in the camera coordinate system, and thus it is not feasible to directly use the original ground equation. Since a ground surface is a plane, in the present application, a homography relationship between two ground surfaces before and after shake may be acquired by using an image registration algorithm, the bottom surface center point of the obstacle after shake is transformed onto the pixel coordinates before shake through the homography relationship, and then the 3D position of the obstacle under the camera shake is corrected/optimized by using the original ground equation to go back to 3D, which is equivalent to eliminate effects of the shake.

Correspondingly, FIG. 1 is a flow chart of a method of obstacle 3D position acquisition for a roadside computing device according to the present application. As shown in FIG. 1, the method includes the following implementation manners.

In 101, pixel coordinates of an obstacle in a to-be-processed image are acquired.

For example, the to-be-processed image may be acquired from a roadside camera.

The to-be-processed image is a 2D image. The pixel coordinates of the obstacle may be obtained through obstacle detection on the to-be-processed image.

The to-be-processed image may include one or more obstacles. Each obstacle may be processed in the manner described in this embodiment.

In 102, coordinates of a bottom surface center point of the obstacle are determined according to the acquired pixel coordinates.

The obstacle is a cuboid. The coordinates of the bottom surface center point refers to pixel coordinates of a bottom surface center point of the cuboid.

For example, 1) by using an image recognition algorithm, a length, a width, and a height of a vehicle are estimated according to a vehicle type identified in an image, coordinates of a vehicle cuboid are calculated according to an identified orientation angle and a geometric relationship, and then coordinates of a bottom surface center point of the vehicle, namely a bottom surface center point of the vehicle cuboid, are calculated. 2) The coordinates of the bottom surface center point are obtained directly by inputting the image into a trained deep learning neural network model.

Certainly, the above is for illustration only and is not intended to limit the technical solution of the present application. How to acquire pixel coordinates of an obstacle in a to-be-processed image and how to determine coordinates of a bottom surface center point of the obstacle according to the acquired pixel coordinates may both be determined according to actual requirements.

In 103, a homography relationship between a ground surface corresponding to the to-be-processed image and a ground surface corresponding to a template image is acquired.

That is, a homography relationship between two ground surfaces before and after shake is acquired.

Camera shake and camera displacement may be found from the template image and the to-be-processed image by using elements such as lane lines.

In 104, the coordinates of the bottom surface center point of the obstacle are transformed into coordinates on the template image according to the homography relationship.

The coordinates of the bottom surface center point of the obstacle may be transformed into coordinates on the template image according to the acquired homography relationship. That is, the coordinates of the bottom surface center point of the obstacle after shake are transformed into pixel coordinates before shake through the homography relationship.

In 105, 3D coordinates of the bottom surface center point of the obstacle are determined according to the coordinates obtained by transformation and a ground equation corresponding to the template image.

After the coordinates after transformation are acquired, 3D coordinates of the bottom surface center point of the obstacle can be determined according to a ground equation corresponding to the template image. A 3D position of the obstacle may be obtained once the 3D coordinates of the bottom surface center point of the obstacle are obtained.

It can be seen that in the above embodiment, 3D coordinates of an obstacle in a to-be-processed image can be determined by means of an acquired homography relationship between a ground surface corresponding to the to-be-processed image and a ground surface corresponding to a template image, which solves the problem of camera shake from the perspective of the image. There is no need to adopt such methods as optical image stabilization, mechanical image stabilization or image stabilization, which not only saves implementation costs, but also has better accuracy.

The method according to the present application may be performed by various roadside devices, such as a roadside computing device, a cloud control platform, or a server connected to roadside cameras to acquire images taken by the roadside camera.

The manner of acquiring a homography relationship between a ground surface corresponding to the to-be-processed image and a ground surface corresponding to a template image in 103 is specifically described below.

The homography relationship may be embodied with a 3*3 homography matrix with 8 degrees of freedom. That is, a 3*3 homography matrix with 8 degrees of freedom is acquired to describe the homography relationship between the ground surface corresponding to the to-be-processed image and the ground surface corresponding to the template image.

To acquire the homography matrix, at least four matching pairs are required, and the matching pairs are 2D-2D matching pairs. Correspondingly, for four regions of interest selected in the template image, for example, four regions including lane line markers, corresponding regions of interest may be acquired from the to-be-processed image respectively, for any region of interest in the to-be-processed image, corresponding relationships among a pixel center point of the region of interest and pixel center points of the corresponding regions of interest in the template image may be acquired as a matching pair, and then the homography matrix may be determined according to the acquired four matching pairs.

An entire image region of the template image may be divided into four image sub-regions, including an upper-left image sub-region, an upper-right image sub-region, a lower-left image sub-region, and a lower-right image sub-region; and the selected four regions of interest may be located in the four image sub-regions respectively.

The four image sub-regions may be obtained by equally dividing the entire image region of the template image, and a region of interest may be selected from each image sub-region by manual selection. The regions of interest are of the same size, such as 101*101. The selected region of interest generally has the following features: 1) it is on a road surface and does not include non-ground elements such as vehicles and pedestrians; 2) it has an obvious feature, for example, it includes clear lane line features; and 3) it has a unique local feature, for example, there is no particularly similar scenario nearby.

For the four regions of interest in the template image, corresponding regions of interest may be acquired from the to-be-processed image respectively. For example, in the template image, the region of interest in the upper-left image sub-region, is referred to as a first region of interest, the region of interest in the upper-right image sub-region is referred to as a second region of interest, the region of interest in the lower-left image sub-region is referred to as a third region of interest, and the region of interest in the lower-right image sub-region is referred to as a fourth region of interest. Then, in the to-be-processed image, a region of interest corresponding to the first region of interest, a region of interest corresponding to the second region of interest, a region of interest corresponding to the third region of interest, and a region of interest corresponding to the fourth region of interest may be acquired respectively.

Figure 2:
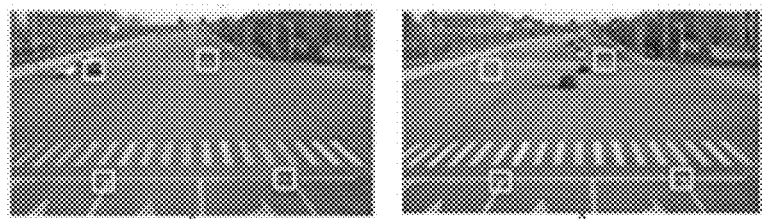
FIG. 2 is a schematic diagram of regions of interest (ROIs) in a to-be-processed image and a template image according to the present application.

FIG. 2 is a schematic diagram of regions of interest in a to-be-processed image and a template image according to the present application. As shown in FIG. 2, the image on the left is the to-be-processed image, and the image on the right is the template image. The to-be-processed image and the template image may be a road traffic image within a field of view taken by a camera at a certain position. The box in the image represents an region of interest, and the template image may be taken when the camera is at an initial standard position.

For any region of interest in the to-be-processed image, corresponding relationships among a pixel center point of the region of interest and pixel center points of the corresponding regions of interest in the template image may be acquired respectively as a matching pair. For example, the following processing may be performed respectively for any region of interest in the to-be-processed image: for ease of expression, taking the region of interest as a to-be-processed region of interest; acquiring a first offset corresponding to the to-be-processed region of interest and used for calculating the homography matrix, and correcting coordinates of a pixel center point of the to-be-processed region of interest by using the first offset; and recording corresponding relationships among the coordinates of the pixel center point of the to-be-processed region of interest and coordinates of pixel center points of the corresponding regions of interest in the template image as a matching pair. How to correct the coordinates of the pixel center point of the to-be-processed region of interest by using the first offset is the prior art.

A manner of acquiring a first offset corresponding to the to-be-processed region of interest may be: if it is determined that the to-be-processed region of interest is not blocked by the obstacle, acquiring a second offset of the to-be-processed region of interest in comparison to the corresponding regions of interest in the template image, and if the second offset meets a predetermined requirement, taking the second offset as the first offset corresponding to the to-be-processed region of interest.

The second offset meeting a predetermined requirement may include: correcting the to-be-processed region of interest by using the second offset; performing similarity check on the corrected to-be-processed region of interest and the corresponding regions of interest in the template image; if the similarity check is successful, adding the second offset to a historical offset queue, and performing rationality check on the second offset according to the historical offset queue; if the similarity check fails, discarding the second offset, and determining that the second offset does not meet the predetermined requirement; if the rationality check is successful, determining that the second offset meets the predetermined requirement; and if the rationality check fails, determining that the second offset does not meet the predetermined requirement.

The performing rationality check on the second offset according to the historical offset queue may include: acquiring a difference between the second offset and a modal offset in the historical offset queue, and if the difference is less than a predetermined threshold, determining that the rationality check is successful; otherwise, determining that the rationality check fails. The modal offset is an offset that occurs the most frequently in the historical offset queue.

In addition, if it is determined that the to-be-processed region of interest is blocked by the obstacle, the modal offset in the historical offset queue may be taken as the first offset corresponding to the to-be-processed region of interest. If it is determined that the second offset does not meet the predetermined requirement, the modal offset in the historical offset queue may also be taken as the first offset corresponding to the to-be-processed region of interest.

In the above manner, through the similarity check and the rationality check, the second offset can be ensured to be a correctly acquired offset, and the accuracy of the subsequent generation of matching pairs can be ensured. For a situation where the second offset is not correctly acquired, for example, the to-be-processed region of interest is blocked by the obstacle or the second offset does not meet the predetermined requirement, matching pairs may be subsequently generated according to a modal offset. The modal offset is an offset that occurs the most frequently in the historical offset queue, is the most representative offset, and is also the most likely to be correct, so as to ensure the accuracy of the generated matching pairs as much as possible.

Figure 3:
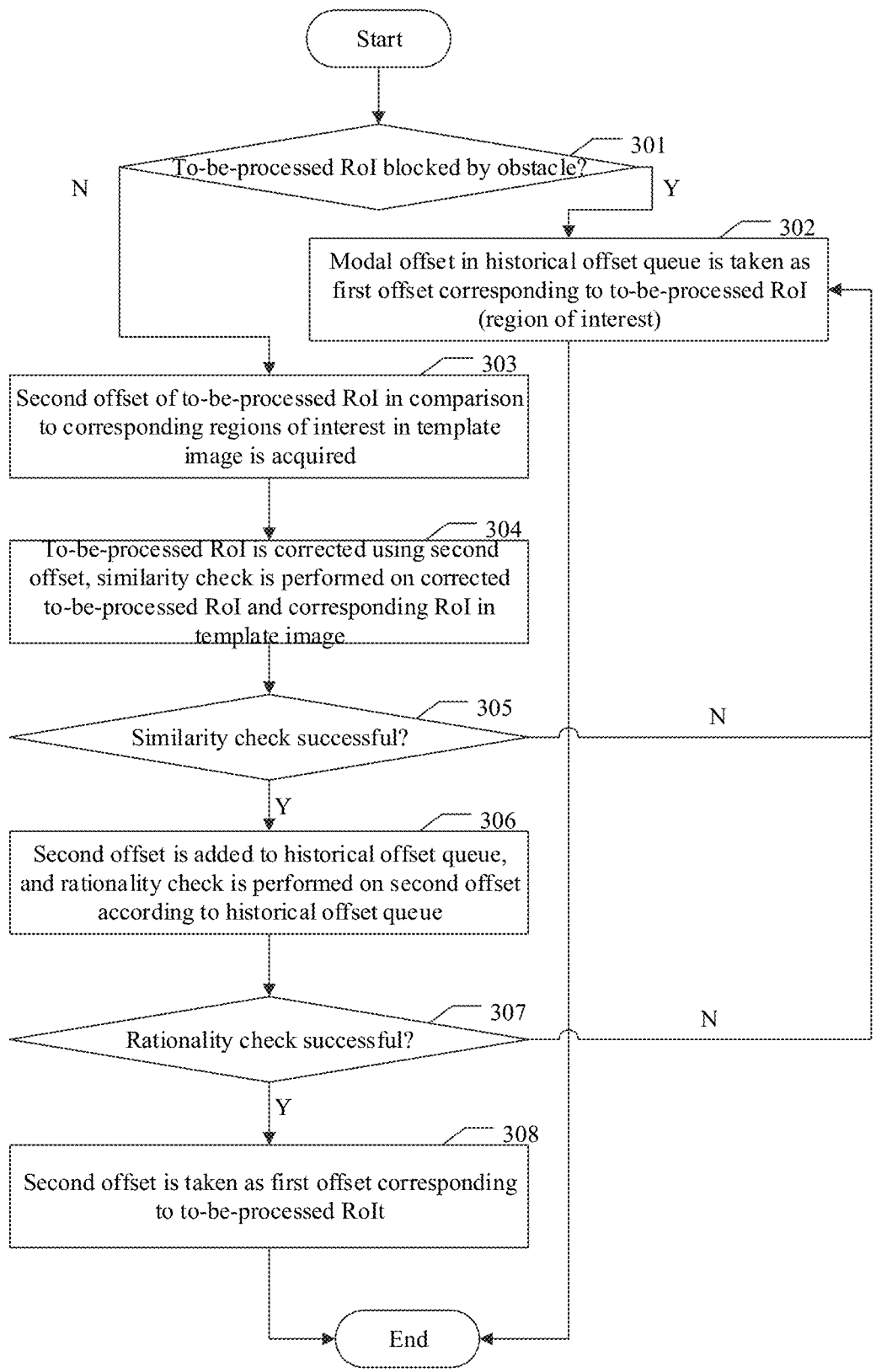
FIG. 3 is a flow chart of an embodiment of a method for acquiring a first offset corresponding to a to-be-processed region of interest according to the present application.

Based on the above introduction, FIG. 3 is a flow chart of an embodiment of a method for acquiring a first offset corresponding to a to-be-processed region of interest according to the present application. As shown in FIG. 3, the method includes the following implementation manners.

In 301, it is determined whether the to-be-processed region of interest is blocked by the obstacle, and if yes, 302 is performed; otherwise, 303 is performed.

The to-be-processed region of interest being blocked by the obstacle may mean that the to-be-processed region of interest is completely blocked by the obstacle or is partially blocked by the obstacle.

In 302, the modal offset in the historical offset queue is taken as the first offset corresponding to the to-be-processed region of interest, and the flow is ended.

The modal offset refers to an offset that occurs the most frequently in the historical offset queue. The historical offset queue may be empty initially, and many offsets may be accumulated subsequently as more offsets are added. The offset that occurs the most frequently is a modal offset.

In 303, a second offset of the to-be-processed region of interest in comparison to the corresponding regions of interest in the template image is acquired. That is, offset degree information of the to-be-processed region of interest in comparison to the corresponding regions of interest in the template image is acquired, and how to acquire the offset degree information is the prior art.

For ease of expression, an offset of the to-be-processed region of interest in comparison to the corresponding regions of interest in the template image is referred to as the second offset.

In 304, the to-be-processed region of interest is corrected by using the second offset, and similarity check is performed on the corrected to-be-processed region of interest and the corresponding regions of interest in the template image.

For example, peak signal to noise ratios and/or structural similarities of the corrected to-be-processed region of interest and the corresponding regions of interest in the template image may be compared. If the peak signal to noise ratios are similar, or the structural similarities are similar, or both are similar, it may be considered that the similarity check is successful. Otherwise, it may be considered that the similarity check fails. Being similar may mean that a difference is less than a predetermined threshold or the like.

In 305, it is determined whether the similarity check is successful, and if yes, 306 is performed; otherwise, 302 is performed.

If the similarity check fails, the second offset is discarded, and 302 is performed.

In 306, the second offset is added to a historical offset queue, and rationality check is performed on the second offset according to the historical offset queue.

For example, a difference between the second offset and a modal offset in the historical offset queue may be acquired, and if the difference is less than a predetermined threshold, it may be determined that the rationality check is successful; otherwise, it may be determined that the rationality check fails.

A specific value of the threshold may be determined according to an actual requirement, such as 10 pixels.

In 307, it is determined whether the rationality check is successful, and if yes, 308 is performed; otherwise, 302 is performed.

In 308, the second offset is taken as the first offset corresponding to the to-be-processed region of interest, and the flow is ended.

As described above, after the first offset corresponding to the to-be-processed region of interest is acquired, coordinates of a pixel center point of the to-be-processed region of interest may be corrected by using the first offset, and corresponding relationships among the coordinates of the pixel center point of the to-be-processed region of interest and coordinates of pixel center points of the corresponding regions of interest in the template image may be recorded as a matching pair.

In the above manner, four matching pairs may be acquired, and then the homography matrix may be determined in the existing manner according to the acquired four matching pairs, that is, the homography relationship between the ground surface corresponding to the to-be-processed image and the ground surface corresponding to the template image is determined.

As described in 104 and 105, further, the coordinates of the bottom surface center point of the obstacle may also be transformed into coordinates on the template image according to the homography relationship, and 3D coordinates of the bottom surface center point of the obstacle are determined according to the coordinates obtained by transformation and a ground equation corresponding to the template image.

In the above manner, the problem of camera shake is solved from the perspective of the image. There is no need to adopt such methods as optical image stabilization, mechanical image stabilization or image stabilization, which not only saves implementation costs, but also has better accuracy. In addition, the implementation manner is simple and convenient, and has universal applicability.

Figure 4:
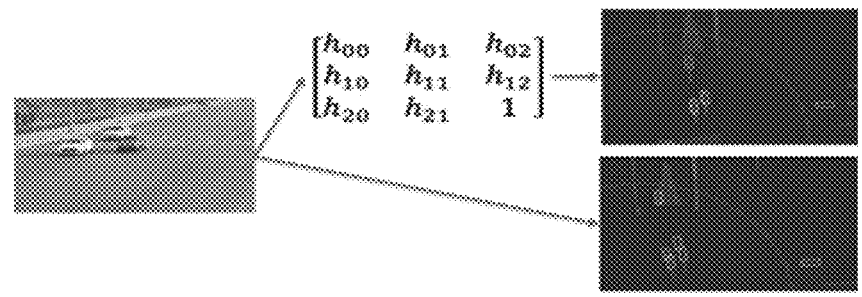
FIG. 4 is a schematic diagram of back 3D effects of the method according to the present application and an existing method respectively.

FIG. 4 is a schematic diagram of back 3D effects of the method according to the present application and an existing method respectively. As shown in FIG. 4, the upper image on the right is a schematic diagram of a back 3D effect of the method according to the present application, and the lower image is a schematic diagram of a back 3D effect of the existing method. The matrix in the figure represents a homography matrix.

It shall be noted that for ease of description, the foregoing method embodiment is described as a series of action combinations. However, those skilled in the art should understand that the embodiments of the present application are not limited to the sequence of actions described, as some steps may be performed in another sequence or simultaneously according to the present application. Next, those skilled in the art should also understand that the embodiments described in this specification all belong to preferred embodiments, and actions and modules involved are not necessarily mandatory to the present application. In addition, the parts not detailed in one embodiment can be obtained with reference to the related description in other embodiments.

The above is an introduction to the method embodiment, and the following is a further description of the solution according to the present application through an apparatus embodiment.

Figure 5:
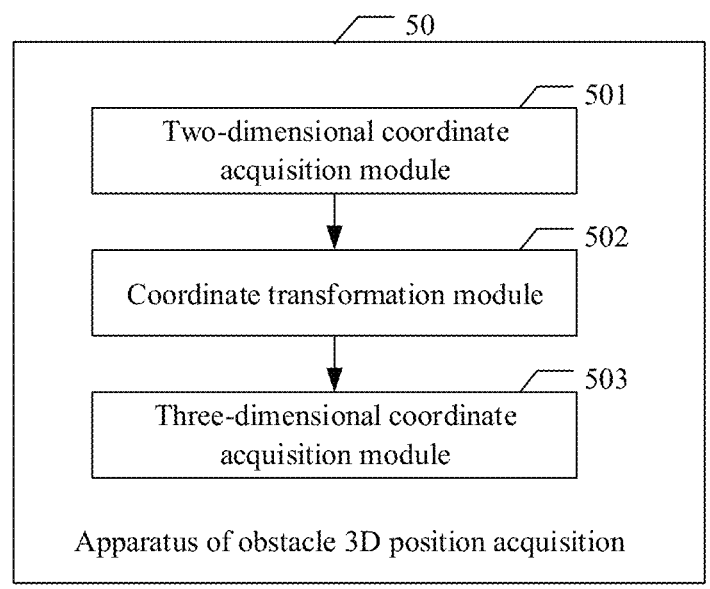
FIG. 5 is a schematic composite structure diagram of an embodiment of an apparatus 50 of obstacle 3D position acquisition for a roadside computing device according to the present application.

FIG. 5 is a schematic composite structure diagram of an embodiment of an apparatus 50 of obstacle 3D position acquisition for a roadside computing device according to the present application. As shown in FIG. 5, the apparatus includes: a two-dimensional coordinate acquisition module 501, a coordinate transformation module 502, and a three-dimensional coordinate acquisition module 503.

The two-dimensional coordinate acquisition module 501 is configured to acquire pixel coordinates of an obstacle in a to-be-processed image, and determine coordinates of a bottom surface center point of the obstacle according to the pixel coordinates.

The coordinate transformation module 502 is configured to acquire a homography relationship between a ground surface corresponding to the to-be-processed image and a ground surface corresponding to a template image, and transform the coordinates of the bottom surface center point of the obstacle into coordinates on the template image according to the homography relationship.

The three-dimensional coordinate acquisition module 503 is configured to determine 3D coordinates of the bottom surface center point of the obstacle according to the coordinates obtained by transformation and a ground equation corresponding to the template image.

Preferably, the coordinate transformation module 502 may acquire a 3*3 homography matrix with 8 degrees of freedom.

The coordinate transformation module 502 may acquire, for four regions of interest selected in the template image, corresponding regions of interest from the to-be-processed image respectively, acquire, for any region of interest in the to-be-processed image, corresponding relationships among a pixel center point of the region of interest and pixel center points of the corresponding regions of interest in the template image as a matching pair, and determine the homography matrix according to the acquired four matching pairs.

An entire image region of the template image may be divided into four image sub-regions, including an upper-left image sub-region, an upper-right image sub-region, a lower-left image sub-region, and a lower-right image sub-region; and the selected four regions of interest may be located in the four image sub-regions respectively.

The coordinate transformation module 502 may perform the following processing respectively for any region of interest in the to-be-processed image: taking the region of interest as a to-be-processed region of interest; acquiring a first offset corresponding to the to-be-processed region of interest and used for calculating the homography matrix, and correcting coordinates of a pixel center point of the to-be-processed region of interest by using the first offset; and recording corresponding relationships among the coordinates of the pixel center point of the to-be-processed region of interest and coordinates of pixel center points of the corresponding regions of interest in the template image as a matching pair.

The coordinate transformation module 502 is configured to, if it is determined that the to-be-processed region of interest is not blocked by the obstacle, acquire a second offset of the to-be-processed region of interest in comparison to the corresponding regions of interest in the template image, and if the second offset meets a predetermined requirement, take the second offset as the first offset corresponding to the to-be-processed region of interest.

For example, the coordinate transformation module 502 may correct the to-be-processed region of interest by using the second offset; perform similarity check on the corrected to-be-processed region of interest and the corresponding regions of interest in the template image; if the similarity check is successful, add the second offset to a historical offset queue, and perform rationality check on the second offset according to the historical offset queue; if the similarity check fails, discard the second offset, and determine that the second offset does not meet the predetermined requirement; if the rationality check is successful, determine that the second offset meets the predetermined requirement; and if the rationality check fails, determine that the second offset does not meet the predetermined requirement.

During the rationality check, the coordinate transformation module 502 may acquire a difference between the second offset and a modal offset in the historical offset queue, and if the difference is less than a predetermined threshold, determine that the rationality check is successful; otherwise, determine that the rationality check fails; wherein the modal offset is an offset that occurs the most frequently in the historical offset queue.

In addition, the coordinate transformation module 502 may, if it is determined that the to-be-processed region of interest is blocked by the obstacle, take the modal offset in the historical offset queue as the first offset corresponding to the to-be-processed region of interest; wherein the modal offset is an offset that occurs the most frequently in the historical offset queue, and if it is determined that the second offset does not meet the predetermined requirement, take the modal offset in the historical offset queue as the first offset corresponding to the to-be-processed region of interest.

The specific workflow of the apparatus embodiment shown in FIG. 5 can be obtained with reference to the related description in the above method embodiment and is not repeated.

In conclusion, by use of the solution in the apparatus embodiment of the present application, 3D coordinates of an obstacle in a to-be-processed image can be determined by means of an acquired homography relationship between a ground surface corresponding to the to-be-processed image and a ground surface corresponding to a template image, which solves the problem of camera shake from the perspective of the image. There is no need to adopt such methods as optical image stabilization, mechanical image stabilization or image stabilization, which not only saves implementation costs, but also has better accuracy.

According to embodiments of the present application, the present application further provides an electronic device and a readable storage medium.

Figure 6:
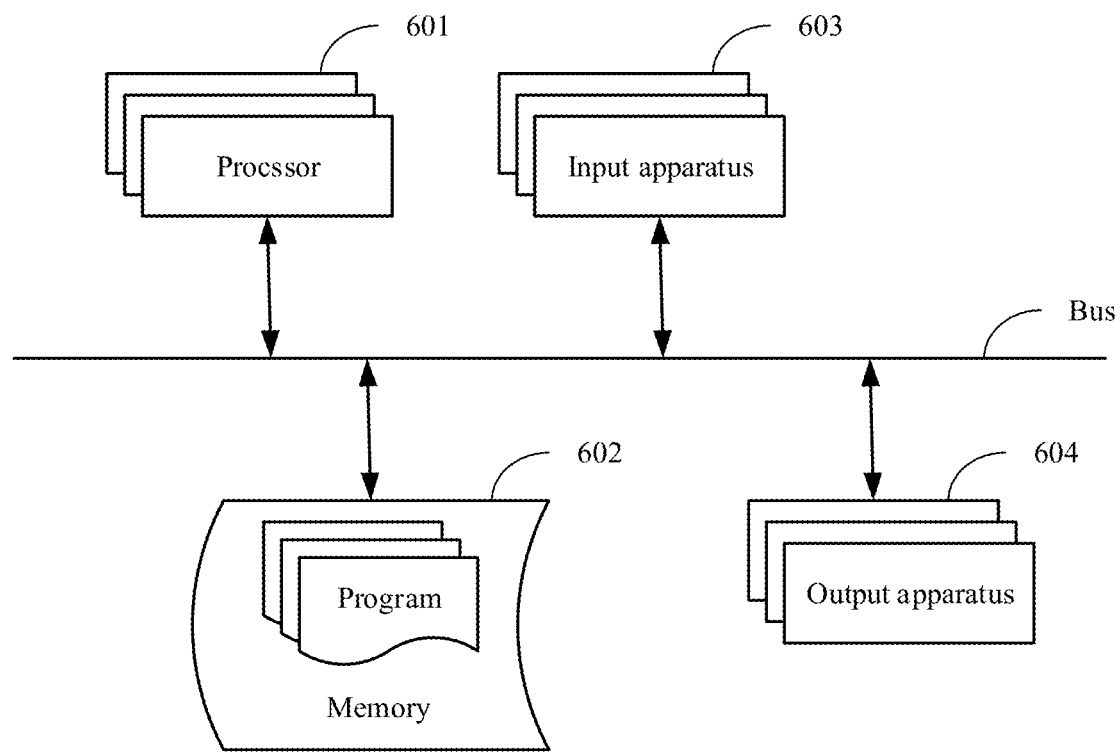
FIG. 6 is a block diagram of an electronic device for a method according to an embodiment of the present application.

As shown in FIG. 6, it is a block diagram of an electronic device for a method according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 6, the electronic device includes: one or more processors 601, a memory 602, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 601 is taken as an example is FIG. 6.

The memory 602 is the non-instantaneous computer-readable storage medium according to the present application. The memory stores instructions executable by at least one processor to make the at least one processor perform the method according to the present application. The non-instantaneous computer-readable storage medium according to the present application stores computer instructions. The computer instructions are used to make a computer perform the method according to the present application.

The memory 602, as a non-instantaneous computer-readable storage medium, may be configured to store non-instantaneous software programs, non-instantaneous computer executable programs and modules, for example, program instructions/modules corresponding to the method in the embodiment of the present application. The processor 601 runs the non-instantaneous software programs, instructions and modules stored in the memory 602 to execute various functional applications and data processing of a server, that is, to implement the method in the above method embodiment.

The memory 602 may include a program storage area and a data storage area. The program storage area may store an operating system and an application required by at least one function; and the data storage area may store data created according to use of the electronic device. In addition, the memory 602 may include a high-speed random access memory, and may further include a non-instantaneous memory, for example, at least one disk storage device, a flash memory device, or other non-instantaneous solid-state storage devices. In some embodiments, the memory 602 optionally includes memories remotely disposed relative to the processor 601. The remote memories may be connected to the electronic device over a network. Examples of the network include, but are not limited to, the Internet, intranets, blockchain networks, local area networks, mobile communication networks and combinations thereof.

The electronic device may further include: an input apparatus 603 and an output apparatus 604. The processor 601, the memory 602, the input apparatus 603 and the output apparatus 604 may be connected through a bus or in other manners. In FIG. 6, the connection through a bus is taken as an example.

The input apparatus 603 may receive input numerical information or character information, and generate key signal input related to user setting and function control of the electronic device, for example, input apparatuses such as a touch screen, a keypad, a mouse, a trackpad, a touch pad, a pointer, one or more mouse buttons, a trackball, and a joystick. The output apparatus 604 may include a display device, an auxiliary lighting apparatus and a tactile feedback apparatus (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube or a liquid crystal display monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described herein can be implemented in a computing system including background components (for example, as a data server), or a computing system including middleware components (for example, an application server), or a computing system including front-end components (for example, a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network, a wide area network, a blockchain network, and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as cloud computing server or cloud host, which is a host product in the cloud computing service system to solve the problems of difficult management and weak business scalability in the traditional physical host and VPS service.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A method of obstacle three-dimensional (3D) position acquisition for a roadside computing device, comprising:
    acquiring pixel coordinates of an obstacle in a to-be-processed image;
    determining coordinates of a bottom surface center point of the obstacle according to the pixel coordinates;
    acquiring a homography relationship between a ground surface corresponding to the to-be-processed image and a ground surface corresponding to a template image;
    transforming the coordinates of the bottom surface center point of the obstacle into coordinates on the template image according to the homography relationship; and
    determining 3D coordinates of the bottom surface center point of the obstacle according to the coordinates obtained by transformation and a ground equation corresponding to the template image,
    wherein the acquiring a homography relationship between a ground surface corresponding to the to-be-processed image and a ground surface corresponding to a template image comprises: acquiring a 3*3 homography matrix with 8 degrees of freedom,
    wherein the acquiring a 3*3 homography matrix with 8 degrees of freedom comprises:
    acquiring, for four regions of interest selected in the template image, corresponding regions of interest from the to-be-processed image respectively;
    acquiring, for any region of interest in the to-be-processed image, corresponding relationships among a pixel center point of the region of interest and pixel center points of the corresponding regions of interest in the template image as a matching pair; and
    determining the homography matrix according to the acquired four matching pairs,
    wherein the acquiring, for any region of interest in the to-be-processed image, corresponding relationships among a pixel center point of the region of interest and pixel center points of the corresponding regions of interest in the template image as a matching pair comprises:
    performing the following processing respectively for any region of interest in the to-be-processed image:
    taking the region of interest as a to-be-processed region of interest;
    acquiring a first offset corresponding to the to-be-processed region of interest and used for calculating the homography matrix, and correcting coordinates of a pixel center point of the to-be-processed region of interest by using the first offset; and
    recording corresponding relationships among the coordinates of the pixel center point of the to-be-processed region of interest and coordinates of pixel center points of the corresponding regions of interest in the template image as a matching pair.

2. The method according to claim 1, wherein
    an entire image region of the template image is divided into four image sub-regions, comprising an upper-left image sub-region, an upper-right image sub-region, a lower-left image sub-region, and a lower-right image sub-region; and the selected four regions of interest are located in the four image sub-regions respectively.

3. The method according to claim 1, wherein the acquiring a first offset corresponding to the to-be-processed region of interest and used for calculating the homography matrix comprises:
    if it is determined that the to-be-processed region of interest is not blocked by the obstacle, acquiring a second offset of the to-be-processed region of interest in comparison to the corresponding regions of interest in the template image, and if the second offset meets a predetermined requirement, taking the second offset as the first offset corresponding to the to-be-processed region of interest.

4. The method according to claim 3, wherein the second offset meeting a predetermined requirement comprises:
    correcting the to-be-processed region of interest by using the second offset;
    performing similarity check on the corrected to-be-processed region of interest and the corresponding regions of interest in the template image;
    if the similarity check is successful, adding the second offset to a historical offset queue, and performing rationality check on the second offset according to the historical offset queue;
    otherwise, discarding the second offset, and determining that the second offset does not meet the predetermined requirement; and
    if the rationality check is successful, determining that the second offset meets the predetermined requirement;

otherwise, determining that the second offset does not meet the predetermined requirement.

5. The method according to claim 4, wherein the performing rationality check on the second offset according to the historical offset queue comprises:
acquiring a difference between the second offset and a modal offset in the historical offset queue, and if the difference is less than a predetermined threshold, determining that the rationality check is successful; otherwise, determining that the rationality check fails;
wherein the modal offset is an offset that occurs the most frequently in the historical offset queue.

6. The method according to claim 4, further comprising:
if it is determined that the to-be-processed region of interest is blocked by the obstacle, taking the modal offset in the historical offset queue as the first offset corresponding to the to-be-processed region of interest; wherein the modal offset is an offset that occurs the most frequently in the historical offset queue; and
if it is determined that the second offset does not meet the predetermined requirement, taking the modal offset in the historical offset queue as the first offset corresponding to the to-be-processed region of interest.

7. The method according to claim 1, wherein the to-be-processed image is acquired from a roadside camera.

8. An electronic device, comprising:
at least one processor; and
a memory communicatively connected with the at least one processor;
wherein the memory stores instructions executable by the at least one processor, and the instructions are executed by the at least one processor to enable the at least one processor to perform a method of obstacle three-dimensional (3D) position acquisition for a roadside computing device, wherein the method comprises:
acquiring pixel coordinates of an obstacle in a to-be-processed image;
determining coordinates of a bottom surface center point of the obstacle according to the pixel coordinates;
acquiring a homography relationship between a ground surface corresponding to the to-be-processed image and a ground surface corresponding to a template image;
transforming the coordinates of the bottom surface center point of the obstacle into coordinates on the template image according to the homography relationship; and
determining 3D coordinates of the bottom surface center point of the obstacle according to the coordinates obtained by transformation and a ground equation corresponding to the template image,
wherein the acquiring a homography relationship between a ground surface corresponding to the to-be-processed image and a ground surface corresponding to a template image comprises: acquiring a 3*3 homography matrix with 8 degrees of freedom,
wherein the acquiring a 3*3 homography matrix with 8 degrees of freedom comprises:
acquiring, for four regions of interest selected in the template image, corresponding regions of interest from the to-be-processed image respectively;
acquiring, for any region of interest in the to-be-processed image, corresponding relationships among a pixel center point of the region of interest and pixel center points of the corresponding regions of interest in the template image as a matching pair; and
determining the homography matrix according to the acquired four matching pairs,
wherein the acquiring, for any region of interest in the to-be-processed image, corresponding relationships among a pixel center point of the region of interest and pixel center points of the corresponding regions of interest in the template image as a matching pair comprises:
performing the following processing respectively for any region of interest in the to-be-processed image:
taking the region of interest as a to-be-processed region of interest;
acquiring a first offset corresponding to the to-be-processed region of interest and used for calculating the homography matrix, and correcting coordinates of a pixel center point of the to-be-processed region of interest by using the first offset; and
recording corresponding relationships among the coordinates of the pixel center point of the to-be-processed region of interest and coordinates of pixel center points of the corresponding regions of interest in the template image as a matching pair.

9. The electronic device according to claim 8, wherein
an entire image region of the template image is divided into four image sub-regions, comprising an upper-left image sub-region, an upper-right image sub-region, a lower-left image sub-region, and a lower-right image sub-region; and the selected four regions of interest are located in the four image sub-regions respectively.

10. The electronic device according to claim 8, wherein
the acquiring a first offset corresponding to the to-be-processed region of interest and used for calculating the homography matrix comprises:
if it is determined that the to-be-processed region of interest is not blocked by the obstacle, acquiring a second offset of the to-be-processed region of interest in comparison to the corresponding regions of interest in the template image, and if the second offset meets a predetermined requirement, taking the second offset as the first offset corresponding to the to-be-processed region of interest.

11. The electronic device according to claim 10, wherein
the second offset meeting a predetermined requirement comprises:
correcting the to-be-processed region of interest by using the second offset;
performing similarity check on the corrected to-be-processed region of interest and the corresponding regions of interest in the template image;
if the similarity check is successful, adding the second offset to a historical offset queue, and performing rationality check on the second offset according to the historical offset queue; otherwise, discarding the second offset, and determining that the second offset does not meet the predetermined requirement; and
if the rationality check is successful, determining that the second offset meets the predetermined requirement; otherwise, determining that the second offset does not meet the predetermined requirement.

12. The electronic device according to claim 11, wherein
the performing rationality check on the second offset according to the historical offset queue comprises:
acquiring a difference between the second offset and a modal offset in the historical offset queue, and if the difference is less than a predetermined threshold, determining that the rationality check is successful; otherwise, determining that the rationality check fails;
wherein the modal offset is an offset that occurs the most frequently in the historical offset queue.

13. The electronic device according to claim 11, further comprising:

if it is determined that the to-be-processed region of interest is blocked by the obstacle, taking the modal offset in the historical offset queue as the first offset corresponding to the to-be-processed region of interest; wherein the modal offset is an offset that occurs the most frequently in the historical offset queue; and if it is determined that the second offset does not meet the predetermined requirement, taking the modal offset in the historical offset queue as the first offset corresponding to the to-be-processed region of interest.

14. A non-transitory computer readable storage medium with computer instructions stored thereon, wherein the computer instructions are used for causing a computer to perform a method of obstacle three-dimensional (3D) position acquisition for a roadside computing device, wherein the method comprises:

acquiring pixel coordinates of an obstacle in a to-be-processed image;

determining coordinates of a bottom surface center point of the obstacle according to the pixel coordinates;

acquiring a homography relationship between a ground surface corresponding to the to-be-processed image and a ground surface corresponding to a template image;

transforming the coordinates of the bottom surface center point of the obstacle into coordinates on the template image according to the homography relationship; and determining 3D coordinates of the bottom surface center point of the obstacle according to the coordinates obtained by transformation and a ground equation corresponding to the template image, wherein the acquiring a homography relationship between a ground surface corresponding to the to-be-processed image and a ground surface corresponding to a template image comprises: acquiring a 3*3 homography matrix with 8 degrees of freedom, wherein the acquiring a 3*3 homography matrix with 8 degrees of freedom comprises:

acquiring, for four regions of interest selected in the template image, corresponding regions of interest from the to-be-processed image respectively;

acquiring, for any region of interest in the to-be-processed image, corresponding relationships among a pixel center point of the region of interest and pixel center points of the corresponding regions of interest in the template image as a matching pair; and determining the homography matrix according to the acquired four matching pairs, wherein the acquiring, for any region of interest in the to-be-processed image, corresponding relationships among a pixel center point of the region of interest and pixel center points of the corresponding regions of interest in the template image as a matching pair comprises:

performing the following processing respectively for any region of interest in the to-be-processed image:

taking the region of interest as a to-be-processed region of interest;

acquiring a first offset corresponding to the to-be-processed region of interest and used for calculating the homography matrix, and correcting coordinates of a pixel center point of the to-be-processed region of interest by using the first offset; and recording corresponding relationships among the coordinates of the pixel center point of the to-be-processed region of interest and coordinates of pixel center points of the corresponding regions of interest in the template image as a matching pair.

* * * * *